(12) United States Patent
Jin et al.

(10) Patent No.: US 11,165,480 B2
(45) Date of Patent: Nov. 2, 2021

(54) DATA TRANSMISSION METHOD AND APPARATUS

(71) Applicant: HUAWEI TECHNOLOGIES CO., LTD., Guangdong (CN)

(72) Inventors: Huangping Jin, Shanghai (CN); Xiaoyan Bi, Shanghai (CN); Min Zhang, Shenzhen (CN); Wei Han, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/805,271

(22) Filed: Feb. 28, 2020

(65) Prior Publication Data
US 2020/0204233 A1 Jun. 25, 2020

Related U.S. Application Data

(63) Continuation of application No. PCT/CN2018/101305, filed on Aug. 20, 2018.

(30) Foreign Application Priority Data

Sep. 1, 2017 (CN) .......................... 201710779976.7

(51) Int. Cl.
*H04B 7/06* (2006.01)
*H04B 7/0417* (2017.01)
*H04B 7/0456* (2017.01)

(52) U.S. Cl.
CPC ........... *H04B 7/063* (2013.01); *H04B 7/0417* (2013.01); *H04B 7/0486* (2013.01); *H04B 7/0626* (2013.01)

(58) Field of Classification Search
CPC .. H04B 7/0619; H04B 7/0621; H04B 7/0626; H04B 7/063; H04B 7/0632;
(Continued)

(56) References Cited

U.S. PATENT DOCUMENTS 8,867,495 B2 * 10/2014 Farajidana ........... H04B 7/0632
370/334
2013/0322280 A1 12/2013 Pi
2018/0115357 A1 4/2018 Park et al.

FOREIGN PATENT DOCUMENTS

CN 101202577 A 6/2008
CN 102013904 A 4/2011
(Continued)

OTHER PUBLICATIONS

Qualcomm Incorporated: "Discussion on CSI acquisition",3GPP Draft; R1-1610149,Oct. 1, 2016, XP051159952,total 6 pages.
(Continued)

*Primary Examiner* — Betsy Deppe
(74) *Attorney, Agent, or Firm* — Womble Bond Dickinson (US) LLP (57) ABSTRACT

This application provides a data transmission method and apparatus. The method includes: receiving, by a terminal device, a first reference signal sent by a network device; measuring, by the terminal device, a downlink channel based on the first reference signal, to obtain a channel status of the downlink channel; determining, by the terminal device, a target mode from a plurality of modes based on the channel status of the downlink channel, where information that is used to feed back channel state information (CSI) and that is sent by the terminal device in different modes of the plurality of modes is different; and sending, by the terminal device, indication information to the network device, where the indication information is used to indicate the target mode. The data transmission method and apparatus in the embodiments of this application are conducive to improve flexibility of feeding back CSI.

18 Claims, 3 Drawing Sheets

(58) Field of Classification Search
CPC .. H04B 7/0634; H04B 7/0636; H04B 7/0645; H04B 7/065; H04B 7/0413; H04B 7/0417; H04B 7/0486; H04B 17/30; H04B 17/309; H04W 17/0413; H04W 72/0413

See application file for complete search history.

(56) References Cited

FOREIGN PATENT DOCUMENTS

| | | | |
|---|---|---|---|
| CN | 102237922 | A | 11/2011 |
| CN | 102281128 | A | 12/2011 |
| CN | 103891226 | A | 6/2014 |
| CN | 106160924 | A | 11/2016 |
| CN | 106301509 | A | 1/2017 |
| WO | 2016163841 | A1 | 10/2016 |
| WO | 2016163842 | A1 | 10/2016 |

OTHER PUBLICATIONS

Huawei et al.,"Discussion on reciprocity based DL CSI feedback",3GPP TSG RAN WG1 NR Ad Hoc Meeting R1-1700059,Spokane, USA, Jan. 16-20, 2017,total 3 pages.

Huawei et al: "Discussion on reciprocity based CSI acquisition mechanism",BGPP Draft; R1-1708137,May 14, 2017(May 14, 2017), XP051273333.total 10 pages.

Samsung:"CSI acquisition for DL NR MIMO",3GPP Draft; R1-1612500,Nov. 4, 2016 (Nov. 4, 2016), XP051189379,total 4 pages.

* cited by examiner

DATA TRANSMISSION METHOD AND APPARATUS

CROSS-REFERENCE TO RELATED APPLICATIONS

This application is a continuation of International Application No. PCT/CN2018/101305, filed on Aug. 20, 2018, which claims priority to Chinese Patent Application No. 201710779976.7, filed on Sep. 1, 2017. The disclosures of the aforementioned applications are hereby incorporated by reference in their entireties.

TECHNICAL FIELD

This application relates to the communications field, and in particular, to a data transmission method and apparatus in the communications field.

BACKGROUND

A multiple-input multiple-output (MIMO) technology is widely used in a communications system. The MIMO technology is a technology in which a network device and a terminal device each use a plurality of transmit antennas and a plurality of receive antennas, to enable signals to be transmitted and received by using a plurality of antennas of the network device and the terminal device, so that a transmission mode of multi-layer parallel transmission is used to provide a comparatively high data transmission rate and improve communication quality. Channel state information (CSI) is used to indicate a channel attribute of a communications link, and accuracy of CSI obtained by the network device determines performance of a MIMO system to a great extent. In downlink transmission, the network device may send a channel state information reference signal (CSI-RS), where the channel state information reference signal is used by the terminal device to measure a downlink channel. Generally, the terminal device may feed back measured CSI to the network device, so that the network device learns of a channel status of the downlink channel. Feeding back the CSI by the terminal device to the network device needs to occupy a time-frequency resource for uplink transmission. As a requirement imposed by a wireless communications system for CSI feedback accuracy is increased, more uplink time-frequency resources are occupied during CSI feedback. This leads to an increase in feedback overheads and is not conducive to improvement of system throughput.

In a time division multiplex (TDD) system, downlink transmission and uplink transmission use a same frequency. M antennas of a network device may be used as both transmit antennas and receive antennas, and reciprocity calibration is performed on a receive channel and a transmit channel of each antenna. In addition, N antennas of a terminal device may be used as both transmit antennas and receive antennas, and reciprocity calibration is also performed on a receive channel and a transmit channel of each antenna. When reciprocity calibration is performed on both the network device and the terminal device, the network device may determine a downlink channel based on an uplink channel. Therefore, in a system (for example, the TDD system) with channel reciprocity, a simpler method may be used to obtain CSI. To be specific, the terminal device sends a sounding reference signal (SRS), and the network device receives the SRS to obtain the uplink channel. The network device may obtain the downlink channel by using the channel reciprocity.

However, due to a limitation of comparatively high costs of a transmit channel of an antenna, quantities of transmit channels of many terminal devices are less than quantities of receive channels. For example, a terminal device has four antennas (antennas numbered 1 to 4), and each antenna is configured with a receive channel, but the terminal device has only two transmit channels. Therefore, at each moment, only two antennas of the terminal device can be used as transmit channels to send SRSs. It is assumed that the terminal device sends the SRSs by using an antenna 1 and an antenna 2, and an uplink channel obtained by the network device is an uplink channel matrix from the two antennas of the terminal device to the network device. According to the channel reciprocity, the network device can obtain only a downlink channel from the M antennas of the network device to the antenna 1 and the antenna 2 of the terminal device, and cannot obtain a downlink channel of an antenna 3 and an antenna 4. In other words, the downlink channel obtained by the network device is incomplete. In this case, the network device needs to send CSI-RSs to the terminal device to obtain the downlink channel of the antenna 3 and the antenna 4.

In a case in which reciprocity calibration is performed on both the network device and the terminal device, how to improve flexibility of feeding back CSI by the terminal device becomes an urgent problem that needs to be resolved.

SUMMARY

This application provides a data transmission method and apparatus, to improve flexibility of feeding back CSI by a terminal device.

According to a first aspect, a data transmission method is provided, including: receiving, by a terminal device, a first reference signal sent by a network device; measuring, by the terminal device, a downlink channel based on the first reference signal, to obtain a channel status of the downlink channel; determining, by the terminal device, a target mode from a plurality of modes based on the channel status of the downlink channel, where information that is used to feed back channel state information (CSI) and that is sent by the terminal device in different modes of the plurality of modes is different; and sending, by the terminal device, indication information to the network device, where the indication information is used to indicate the target mode.

In one embodiment, when the network device needs to obtain the channel status of the downlink channel, the network device may first send the first reference signal to the terminal device, and the terminal device receives the first reference signal, and measures the downlink channel to obtain the channel status of the downlink channel, that is, the CSI. Then, the terminal device may determine a proper mode based on the channel status of the downlink channel and n transmit ports of the terminal device, and send corresponding information to the network device, so that the network device obtains the CSI.

It should be understood that the foregoing different modes of the plurality of modes may respectively correspond to different content, and the plurality of modes may be preconfigured by the network device for the terminal device by using signaling, or may be agreed on in a protocol. This is not limited in this embodiment of this application.

In this embodiment of this application, the terminal device first obtains the channel status of the downlink channel based on the first reference signal sent by the network device, and then selects, from the plurality of modes with reference to the channel status, a target mode used to feed back current CSI, and notifies the network device by using the indication information. In this way, flexibility of feeding back the CSI by the terminal device can be improved.

In one embodiment, the plurality of modes include a first mode, a second mode, and a third mode; in the first mode, the terminal device feeds back all information of the CSI; in the second mode, the terminal device feeds back a part of information of the CSI, and sends a second reference signal; and in the third mode, the terminal device sends the second reference signal. The all information is used to indicate a channel status of all of the downlink channel, and the part of information is used to indicate a channel status of a part of the downlink channel.

In one embodiment, in the first mode, after receiving the first reference signal sent by the network device, the terminal device obtains the CSI, and feeds back all the information of the CSI to the network device. This mode is a CSI feedback manner in an FDD system, and channel reciprocity is not used. In the second mode, after receiving the first reference signal sent by the network device, the terminal device obtains the CSI, and feeds back the part of information of the CSI to the network device. In addition, the terminal device sends the second reference signal to the network device. The second reference signal is used by the network device to estimate an uplink channel, to obtain a corresponding downlink channel. This mode effectively uses channel reciprocity. In the third mode, after receiving the first reference signal sent by the network device, the terminal device obtains the CSI, but the terminal device sends the second reference signal to the network device. Because a part of a downlink channel in all of the downlink channel may be strongly correlated, in this mode, the terminal device has learned of the channel status of the downlink channel, and determines that the network device can obtain a channel status of all of the downlink channel by using only the second reference signal, with no need to feed back the CSI. In this way, overheads for feeding back the CSI can be greatly reduced.

In one embodiment, the terminal device includes m receive ports and n transmit ports, the m receive ports include the n transmit ports, and both m and n are positive integers. It should be understood that the n transmit ports of the terminal device may be fixed or not fixed. This is not limited in this embodiment of this application. For example, m=4, and n=2. The terminal device has four ports (ports numbered 1 to 4), and each port is configured as a receive port. However, the terminal device has only two transmit ports. Therefore, at each moment, only two ports of the terminal device can be used as transmit ports. If the two transmit ports of the terminal device are fixed and are a port 1 and a port 2, the terminal device sends the second reference signal each time through the port 1 and the port 2. If the two transmit ports of the terminal device are not fixed, the terminal device may select two ports from the four ports as transmit ports based on the channel status of the downlink channel, that is, correlation between a downlink channel corresponding to all ports.

In one embodiment, the terminal device includes m receive ports and n transmit ports, the m receive ports include the n transmit ports, and both m and n are positive integers; and when the n transmit ports are fixed, the determining, by the terminal device, a target mode used to feed back channel state information (CSI) from a plurality of modes based on the channel status of the downlink channel includes: determining, by the terminal device, a rank of a channel matrix of the downlink channel and a rank of a correlation matrix of the n transmit ports based on the channel status of the downlink channel; comparing, by the terminal device, the rank of the correlation matrix of the n transmit ports with the rank of the channel matrix of the downlink channel; and if the rank of the correlation matrix of the n transmit ports is equal to the rank of the channel matrix of the downlink channel, determining, by the terminal device, the third mode as the target mode.

In one embodiment, the method further includes: if the rank of the correlation matrix of the n transmit ports is less than the rank of the channel matrix of the downlink channel, determining, by the terminal device, a rank of a correlation matrix of a remaining port other than the n transmit ports in the m receive ports based on the channel status of the downlink channel; comparing, by the terminal device, the rank of the correlation matrix of the remaining port with the rank of the channel matrix of the downlink channel; and if the rank of the correlation matrix of the remaining port is equal to the rank of the channel matrix of the downlink channel, determining, by the terminal device, the first mode as the target mode; or if the rank of the correlation matrix of the remaining port is less than the rank of the channel matrix of the downlink channel, determining, by the terminal device, the second mode as the target mode.

In one embodiment, when the n transmit ports of the terminal device are fixed, the terminal device may first determine the rank of the channel matrix of the downlink channel and the rank of the correlation matrix of the n transmit ports based on the channel status of the downlink channel, and compare the rank of the channel matrix of the downlink channel with the rank of the correlation matrix of the n transmit ports. If the rank of the correlation matrix of the n transmit ports is equal to the rank of the channel matrix of the downlink channel, it indicates that sending the second reference signal by the terminal device through the n transmit ports is sufficient to reflect the channel status of all of the downlink channel. In this case, the terminal device may select the third mode, and in one embodiment, the terminal device may send only the second reference signal to the network device.

If the rank of the correlation matrix of the n transmit ports is less than the rank of the channel matrix of the downlink channel, it indicates that sending the second reference signal by the terminal device through the n transmit ports can reflect a channel status of only the part of the downlink channel. In this case, the terminal device needs to determine a rank of a correlation matrix of remaining m-n ports other than the n transmit ports in the m receive ports based on the channel status that is of the downlink channel and that is obtained through measurement, and compare the rank of the correlation matrix of the remaining m-n ports and the rank of the channel matrix of the downlink channel. If the rank of the correlation matrix of the remaining m-n ports is equal to the rank of the channel matrix of the downlink channel, it indicates that sending the second reference signal by the terminal device through the n transmit ports does not reduce the overheads for feeding back the CSI, and the terminal device still needs to feed back the channel status of all of the downlink channel. In this case, the terminal device does not need to send the second reference signal through the n transmit ports. The first mode may be used to feed back all the information of the CSI.

If the rank of the correlation matrix of the remaining m-n ports is less than the rank of the channel matrix of the downlink channel, it indicates that the terminal device can feed back the channel status of the part of the channel by sending the second reference signal through the n transmit ports, and then feed back a channel status of another part of the channel by feeding back the part of information of the CSI, to achieve a purpose of reducing the overheads for feeding back the CSI. Therefore, in this case, the terminal device may use the second mode.

In one embodiment, the terminal device includes m receive ports and n transmit ports, the m receive ports include the n transmit ports, and both m and n are positive integers; and when the n transmit ports are not fixed, the determining, by the terminal device, a target mode used to feed back channel state information (CSI) from a plurality of modes based on the channel status of the downlink channel includes: determining, by the terminal device, a rank of a channel matrix of the downlink channel based on the channel status of the downlink channel; comparing, by the terminal device, the rank of the channel matrix of the downlink channel with the quantity n of transmit ports; if the rank of the channel matrix of the downlink channel is less than or equal to n, determining, by the terminal device, the third mode as the target mode; and selecting, by the terminal device, n first target ports from the m receive ports as the n transmit ports, where a rank of a correlation matrix of the n first target ports is equal to the rank of the channel matrix of the downlink channel.

In one embodiment, the method further includes: if the rank of the channel matrix of the downlink channel is greater than n, selecting, by the terminal device, n second target ports from the m receive ports as the n transmit ports based on the channel status of the downlink channel, where a rank of a correlation matrix of the n second target ports is n; determining, by the terminal device, a rank of a correlation matrix of a remaining port other than the n second target ports in the m receive ports based on a measurement result of the downlink channel; comparing, by the terminal device, the rank of the correlation matrix of the remaining port with the rank of the channel matrix of the downlink channel; and if the rank of the correlation matrix of the remaining port is equal to the rank of the channel matrix of the downlink channel, determining, by the terminal device, the first mode as the target mode; or if the rank of the correlation matrix of the remaining port is less than the rank of the channel matrix of the downlink channel, determining, by the terminal device, the second mode as the target mode.

In one embodiment, when then transmit ports of the terminal device are not fixed, the terminal device may select, based on an actual situation, n ports as transmit ports, to send the second reference signal. The terminal device may first determine the rank of the channel matrix of the downlink channel based on the channel status of the downlink channel, and compare the rank of the channel matrix of the downlink channel with the quantity n of transmit ports. If the rank of the channel matrix of the downlink channel is less than or equal to n, it indicates that sending the second reference signal by the terminal device through the n transmit ports can reflect the channel status of all of the downlink channel. In this case, the terminal device may use the third mode, and does not need to feed back the CSI. In this case, the terminal device needs to select the n first target ports from the m receive ports as the n transmit ports, and the rank of the correlation matrix of the selected n first target ports is equal to the rank of the channel matrix of the downlink channel.

If the rank of the channel matrix of the downlink channel is greater than n, it indicates that the terminal device cannot feed back the channel status of all of the downlink channel by sending only the second reference signal. In this case, the terminal device further needs to feed back the CSI. The terminal device may first select the n second target ports from the m receive ports as transmit ports, and the rank of the correlation matrix of the selected n second target ports is n. Then, the terminal device compares the rank of the correlation matrix of the n second target ports with the rank of the channel matrix of the downlink channel, to determine a mode used to feed back the CSI. A determining method is the same as the foregoing port fixing method, and details are not described herein.

In this embodiment of this application, because the n transmit ports of the terminal device are not fixed, the terminal device may flexibly select the n transmit ports based on the channel status of the downlink channel, so that channel statuses of more parts of the channel are fed back as much as possible by sending the second reference signal through the n transmit ports. In this way, CSI fed back by the terminal device can be correspondingly reduced, thereby reducing the overheads for feeding back the CSI by the terminal device.

In one embodiment, the terminal device includes m receive ports and n transmit ports, the m receive ports include the n transmit ports, and both m and n are positive integers; and when the target mode is the second mode, the method further includes: determining, by the terminal device based on the rank of the correlation matrix of the remaining port other than the n transmit ports in the m receive ports, the part of the channel that needs to be fed back; sending, by the terminal device, the part of information to the network device, where the part of information is used to indicate a correlation matrix of the part of the channel; and sending, by the terminal device, the second reference signal to the network device through the n transmit ports.

In one embodiment, if the terminal device uses the second mode to feed back the CSI, before feedback, the terminal device may determine, based on the rank of the correlation matrix of the remaining m-n channels, the part of the channel that needs to be fed back. The terminal device sends channel information of the part of the channel to the network device, and sends the second reference signal to the network device through the n transmit ports. The network device receives the second reference signal, performs channel estimation to obtain a channel status of a downlink channel corresponding to the n transmit ports, receives the part of information to obtain a channel status of a downlink channel of the remaining m-n ports, and synthesizes the channel status of the downlink channel corresponding to the n transmit ports and the channel status of the downlink channel of the remaining m-n ports, to obtain the channel status of all of the downlink channel.

In one embodiment, the sending, by the terminal device, the part of information to the network device includes: sending, by the terminal device, an eigenvector and an eigenvalue of the correlation matrix of the part of the channel to the network device; or sending, by the terminal device, the eigenvector, the eigenvalue, and an identifier of a normalization coefficient to the network device, where the normalization coefficient is used to normalize the correlation matrix of the part of the channel.

It should be understood that, when feeding back the part of information of the CSI, the terminal device may feed back only the eigenvector of the correlation matrix of the part of the channel to the network device, or may feed back the eigenvector and the eigenvalue of the correlation matrix of the part of the channel to the network device, or may feed back the eigenvector, the eigenvalue, and the identifier of the normalization coefficient of the correlation matrix of the part of the channel to the network device. This is not limited in this embodiment of this application. Feeding back the eigenvalue can improve accuracy of the CSI. The network device can match, based on the eigenvalue, a channel estimated by using an SRS and power of the part of the channel of CSI feedback, so that a channel synthesized by the network device is more accurate, and a channel synthesis error is reduced. However, because a range is required for quantizing an eigenvalue of a channel, a channel matrix is normalized and a normalization coefficient is reported. In this way, a fixed range of the eigenvalue can be ensured, so that the terminal device quantizes and feeds back the eigenvalue.

In one embodiment, the first reference signal is a channel state information reference signal (CSI-RS); and/or the second reference signal is a sounding reference signal (SRS).

According to a second aspect, another data transmission method is provided, including: sending, by a network device, a first reference signal to a terminal device; and receiving, by the network device, indication information sent by the terminal device based on the first reference signal, where the indication information is used to indicate a target mode that is used by the terminal device used to feed back channel state information (CSI).

According to the data transmission method in this embodiment of this application, the terminal device first obtains a channel status of a downlink channel based on the first reference signal sent by the network device, and then selects, from a plurality of modes with reference to the channel status, the target mode used to feed back current CSI, and notifies the network device by using the indication information. In this way, flexibility of feeding back the CSI by the terminal device can be improved.

In one embodiment, the target mode is a first mode, a second mode, or a third mode; in the first mode, the terminal device feeds back all information of the CSI; in the second mode, the terminal device feeds back a part of information of the CSI, and sends a second reference signal; and in the third mode, the terminal device sends the second reference signal. The all information is used to indicate a channel status of all of the downlink channel, and the part of information is used to indicate a channel status of a part of the downlink channel.

In one embodiment, the target mode is the second mode, and after the network device receives the indication information sent by the terminal device based on the first reference signal, the method further includes: receiving, by the network device, the second reference signal sent by the terminal device; and receiving, by the network device, the part of information sent by the terminal device based on the first reference signal.

In one embodiment, the receiving, by the network device, the part of information sent by the terminal device based on the first reference signal includes: receiving, by the network device, an eigenvector and an eigenvalue that are of a correlation matrix of the part of the channel and that are sent by the terminal device; or receiving, by the network device, the eigenvector, the eigenvalue, and an identifier of a normalization coefficient that are sent by the terminal device, where the normalization coefficient is used to normalize the correlation matrix of the part of the channel.

In one embodiment, the method further includes: performing, by the network device, channel estimation based on the second reference signal, to obtain a correlation matrix of an uplink channel; synthesizing, by the network device, the correlation matrix of the part of the channel based on the eigenvector and the eigenvalue; superposing, by the network device, the correlation matrix of the uplink channel and the correlation matrix of the part of the channel, to obtain a correlation matrix of all of the downlink channel; and obtaining, by the network device, a downlink precoding matrix based on the correlation matrix of the all of the channel.

In one embodiment, the first reference signal is a channel state information reference signal (CSI-RS); and/or the second reference signal is a sounding reference signal (SRS).

According to a third aspect, a data transmission apparatus is provided, and is configured to perform the method in the first aspect. The apparatus includes units configured to perform the method in the first aspect or any embodiment of the first aspect.

According to a fourth aspect, another data transmission apparatus is provided, and is configured to perform the method in the second aspect. The apparatus includes units configured to perform the method in the second aspect or any embodiment of the second aspect.

According to a fifth aspect, still another data transmission apparatus is provided. The apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. When the processor executes the instruction stored in the memory, the execution enables the processor to perform the method in the first aspect or any embodiment of the first aspect.

According to a sixth aspect, yet another data transmission apparatus is provided. The apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. When the processor executes the instruction stored in the memory, the execution enables the processor to perform the method in the second aspect or any embodiment of the second aspect.

According to a seventh aspect, a data transmission system is provided, where the system includes the apparatus in the third aspect or any embodiment of the third aspect and the apparatus in the fourth aspect or any embodiment of the fourth aspect. Alternatively, the system includes the apparatus in the fifth aspect or any embodiment of the fifth aspect and the apparatus in the sixth aspect or any embodiment of the sixth aspect.

According to an eighth aspect, a computer program product is provided, where the computer program product includes computer program code, and when the computer program code is run on a computer, the computer is enabled to perform the method in the first aspect or any embodiment of the first aspect.

According to a ninth aspect, a computer program product is provided, where the computer program product includes computer program code, and when the computer program code is run on a computer, the computer is enabled to perform the method in the second aspect or any embodiment of the second aspect.

According to a tenth aspect, a computer-readable medium is provided and is configured to store a computer program.

The computer program includes an instruction used to perform the method in the first aspect or any embodiment of the first aspect.

According to an eleventh aspect, a computer-readable medium is provided and is configured to store a computer program. The computer program includes an instruction used to perform the method in the second aspect or any embodiment of the second aspect.

DESCRIPTION OF EMBODIMENTS

The following describes the technical solutions in this application with reference to the accompanying drawings.

It should be understood that the technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a future 5th generation (5G) system, or new radio (NR).

It should be further understood that the technical solutions of the embodiments of this application may be alternatively applied to various communications systems based on a non-orthogonal multiple access technology, for example, a sparse code multiple access (SCMA) system. Certainly, SCMA may also be called another name in the communications field. Further, the technical solutions of the embodiments of this application may be applied to a multi-carrier transmission system using the non-orthogonal multiple access technology, for example, an orthogonal frequency division multiplexing (OFDM) system using the non-orthogonal multiple access technology, a filter bank multi-carrier (FBMC) system using the non-orthogonal multiple access technology, a generalized frequency division multiplexing (GFDM) system using the non-orthogonal multiple access technology, or a filtered orthogonal frequency division multiplexing (F-OFDM) system using the non-orthogonal multiple access technology.

It should be further understood that in the embodiments of this application, a terminal device may communicate with one or more core networks via a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communications function, a computing device, another processing device connected to a wireless modem, an in-vehicle device, a wearable device, a terminal device in a future 5G network, a terminal device in a future evolved public land mobile network (PLMN), or the like.

It should be further understood that in the embodiments of this application, a network device may be configured to communicate with the terminal device. The network device may be a base transceiver station (BTS) in a GSM system or a CDMA system, or may be a NodeB (node B, NB) in a WCDMA system, or may be an evolved NodeB (evolutional node B, eNB or eNode B) in an LTE system. Alternatively, the network device may be a relay station, an access point, an in-vehicle device, a wearable device, a network side device in a future 5G network, a network device in a future evolved PLMN network, or the like.

The embodiments of this application may be applicable to an LTE system and a subsequent evolved system such as 5G or other wireless communications systems using various radio access technologies, for example, a system using access technologies such as code division multiple access, frequency division multiple access, time division multiple access, orthogonal frequency division multiple access, and single carrier frequency division multiple access. The embodiments of this application are particularly applicable to a scenario in which channel information needs to be fed back and/or a two-stage precoding technology needs to be used, for example, a wireless network using a massive MIMO technology or a wireless network using a distributed antenna technology.

It should be understood that a multiple-input multiple-output (MIMO) technology is a technology in which a transmit end device and a receive end device each use a plurality of transmit antennas and a plurality of receive antennas, to enable signals to be transmitted and received by using a plurality of antennas of the transmit end device and the receive end device, so as to improve communication quality. In the technology, spatial resources can be fully used, and multiple-transmit multiple-receive is implemented by using the plurality of antennas, so that a system channel capacity can be multiplied without increasing spectrum resources and antenna transmit power.

MIMO may be classified into single-user multiple-input multiple-output (SU-MIMO) and multi-user multiple-input multiple-output (MU-MIMO). In massive MIMO, based on a multi-user beamforming principle, several hundreds of antennas are arranged on a transmit end device, to modulate beams for dozens of target receivers, and dozens of signals are simultaneously transmitted on a same frequency resource by performing space signal isolation. Therefore, in the massive MIMO technology, spatial freedom brought by configuration of massive antennas can be fully used to increase spectral efficiency.

Figure 1:
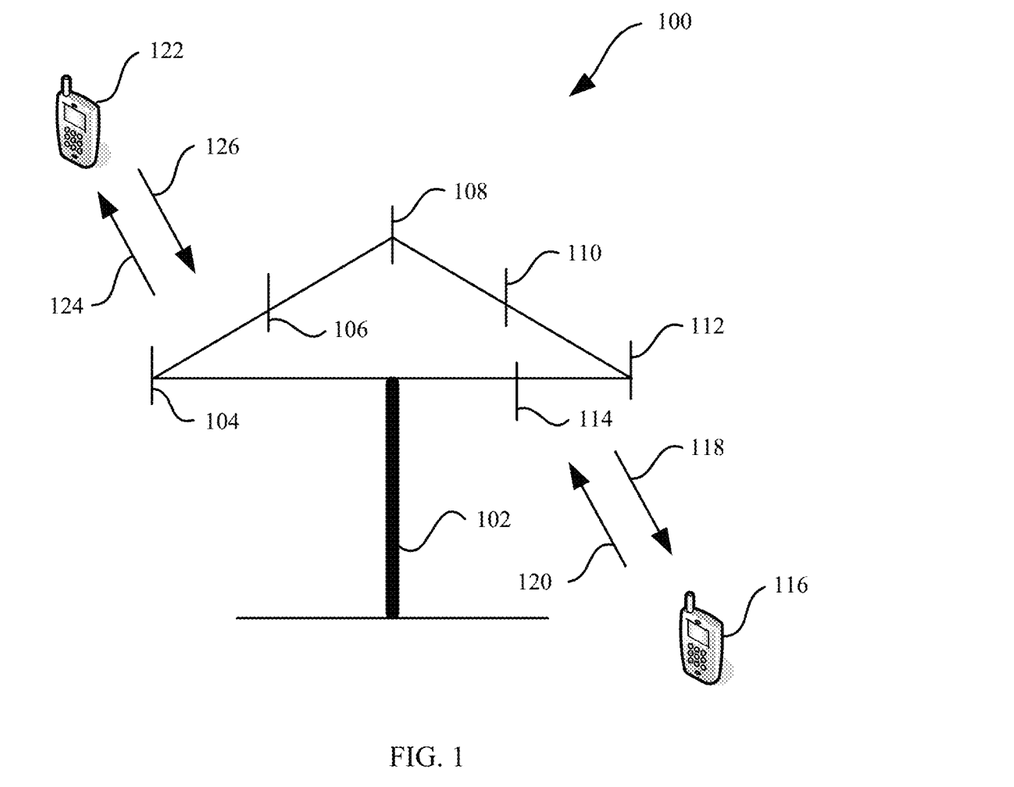
FIG. 1 is a schematic diagram of a communications system according to an embodiment of this application.

FIG. 1 is a schematic diagram of a communications system used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. Two antennas are shown for each antenna group in FIG. 1. However, more or fewer antennas can be used for each group. The network device 102 may additionally include a transmitter chain and a receiver chain. A person of ordinary skill in the art may understand that both the transmitter chain and the receiver chain may include a plurality of components, such as a processor, a modulator, a multiplexer, a demodulator, a demultiplexer, or an antenna, related to signal sending and receiving.

The network device 102 may communicate with a plurality of terminal devices. For example, the network device 102 may communicate with a terminal device 116 and a terminal device 122. However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other appropriate device configured to perform communication on the wireless communications system 100.

As shown in the FIG. 1, the terminal device 116 communicates with the antennas 112 and 114, where the antennas 112 and 114 send information to the terminal device 116 by using a forward link 118, and receive the information from the terminal device 116 by using a reverse link 120. In addition, the terminal device 122 communicates with the antennas 104 and 106, where the antennas 104 and 106 send information to the terminal device 122 by using a forward link 124, and receive the information from the terminal device 122 by using a reverse link 126.

For example, in a frequency division duplex (FDD) system, the forward link 118 may use a frequency band different from a frequency band used on the reverse link 120, and the forward link 124 may use a frequency band different from a frequency band used on the reverse link 126.

For another example, in a time division duplex (TDD) system and a full duplex system, the forward link 118 and the reverse link 120 may use a common frequency band, and the forward link 124 and the reverse link 126 may use a common frequency band.

Each group of antennas and/or each area designed for communication is referred to as a sector of the network device 102. For example, an antenna group may be designed to communicate with a terminal device in the sector within a coverage area of the network device 102. In a process in which the network device 102 respectively communicates with the terminal devices 116 and 122 by using the forward links 118 and 124, a transmit antenna of the network device 102 may use beamforming to improve signal-to-noise ratios of the forward links 118 and 124. In addition, compared with a manner in which the network device sends signals to all terminal devices of the network device by using a single antenna, when the network device 102 sends, by using the beamforming, signals to the terminal devices 116 and 122 that are randomly scattered within a related coverage area, a mobile device in a neighboring cell is subject to less interference.

At a given time, the network device 102, and the terminal device 116 or the terminal device 122 may be a wireless communications sending apparatus and/or a wireless communications receiving apparatus. When sending data, the wireless communications sending apparatus may encode the data for transmission. In one embodiment, the wireless communications sending apparatus may obtain a specific quantity of data bits to be sent to the wireless communications receiving apparatus through a channel. For example, the wireless communications sending apparatus may generate the specific quantity of data bits to be sent to the wireless communications receiving apparatus through the channel, receive the specific quantity of data bits to be sent to the wireless communications receiving apparatus through the channel from another communications apparatus, or store the specific quantity of data bits to be sent to the wireless communications receiving apparatus through the channel in a memory. Such data bits may be included in a transport block or a plurality of transport blocks of the data, and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is merely a simplified schematic diagram of an example used for ease of understanding, and the network may further include another network device that is not shown in FIG. 1.

Figure 2:
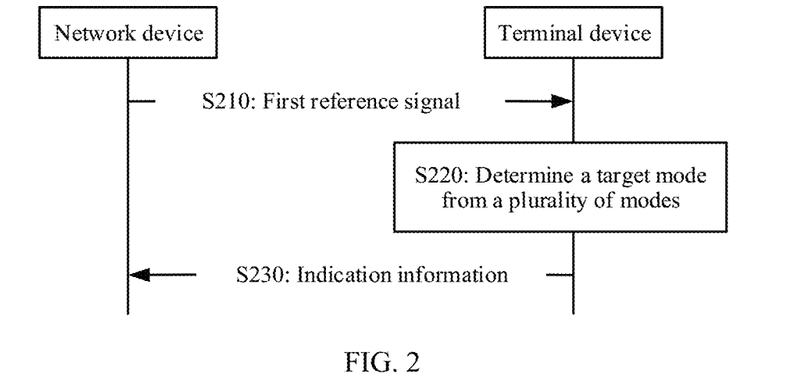
FIG. 2 is a schematic flowchart of a data transmission method according to an embodiment of this application.

FIG. 2 is a schematic flowchart of a data transmission method 200 according to an embodiment of this application. The method 200 may be applied to the communications system 100 shown in FIG. 1. However, this is not limited in this embodiment of this application.

S210: A network device sends a first reference signal to a terminal device.

Correspondingly, the terminal device receives the first reference signal sent by the network device.

S210: The terminal device measures a downlink channel based on the first reference signal, to obtain a channel status of the downlink channel.

S220: The terminal device determines a target mode from a plurality of modes based on the channel status of the downlink channel, where information that is used to feed back channel state information (CSI) and that is sent by the terminal device in different modes of the plurality of modes is different.

S230: The terminal device sends indication information to the network device, where the indication information is used to indicate the target mode.

Correspondingly, the network device receives the indication information sent by the terminal device, and further determines, based on the indication information, the target mode used by the terminal device.

It should be understood that the foregoing different modes of the plurality of modes may respectively correspond to different content, and the plurality of modes may be preconfigured by the network device for the terminal device by using signaling, or may be agreed on in a protocol. This is not limited in this embodiment of this application.

In this embodiment of this application, the terminal device first obtains the channel status of the downlink channel based on the first reference signal sent by the network device, and then selects, from the plurality of modes with reference to the channel status, a target mode used to feed back current CSI, and notifies the network device by using the indication information. In this way, flexibility of feeding back the CSI by the terminal device can be improved.

In one embodiment, the terminal device may further determine the target mode with reference to correlation of transmit ports of the terminal device. It is assumed that the terminal device has n transmit ports, and correlation of the n transmit ports indicates a correlation degree of transmit channels corresponding to the n transmit ports. In one embodiment, the correlation degree may be a rank of a correlation matrix of the n transmit ports. However, this is not limited in this embodiment of this application.

In one embodiment, the first reference signal is a channel state information reference signal (CSI-RS), and/or the second reference signal is a sounding reference signal (SRS).

In one embodiment, when reciprocity calibration is performed on both the network device and the terminal device, the network device may obtain the channel status of the downlink channel in a plurality of manners. For example, in a TDD system, the network device may obtain a channel status of an uplink channel through estimation by receiving the SRS sent by the terminal device, and then obtain the channel status of the corresponding downlink channel; or may obtain, by sending the CSI-RS, the CSI fed back by the terminal device based on the CSI-RS; or may synthesize information obtained through estimation by using the SRS and a part of CSI fed back by the terminal device, to obtain a channel status of all of a downlink channel. In this way, overheads for feeding back the CSI by the terminal device are reduced.

In one embodiment, the plurality of modes include a first mode, a second mode, and a third mode; in the first mode, the terminal device feeds back all information of the CSI; in the second mode, the terminal device feeds back a part of information of the CSI, and sends the second reference signal; and in the third mode, the terminal device sends the second reference signal. The all information is used to indicate a channel status of all of the downlink channel, and the part of information is used to indicate a channel status of a part of the downlink channel.

In one embodiment, the terminal device includes m receive ports and n transmit ports, the m transmit ports include the n receive ports, and both m and n are positive integers.

In this embodiment of this application, the terminal device has m receive ports and n transmit ports, and the m receive ports include the n transmit ports, that is, m>n. Therefore, based on channel reciprocity, the network device can obtain channel statuses of only n ports based on the second reference signal sent by the terminal device. In addition, the network device may still need to send the first reference signal to the terminal device to obtain channel statuses of m-n ports. This depends on correlation between a downlink channel corresponding to the m-n ports. Therefore, when the network device needs to obtain the channel status of the downlink channel, the network device may first send the first reference signal to the terminal device. The terminal device receives the first reference signal, and measures the downlink channel to obtain the channel status of the downlink channel, that is, the CSI. Then, the terminal device may determine, based on the channel status of the downlink channel and the correlation degree of the n transmit ports of the terminal device, a proper mode for feeding back the CSI. In one embodiment, the terminal device may select, from the following three modes, a target mode for feeding back the CSI, so that the CSI is fed back more flexibly.

1. First Mode

After receiving the first reference signal sent by the network device, the terminal device obtains the CSI, and feeds back all the information of the CSI to the network device. This mode is a CSI feedback manner in an FDD system, and channel reciprocity is not used.

2. Second Mode

After receiving the first reference signal sent by the network device, the terminal device obtains the CSI, and feeds back the part of information of the CSI to the network device. In addition, the terminal device sends the second reference signal to the network device. The second reference signal is used by the network device to estimate an uplink channel, to obtain a corresponding downlink channel. Channel reciprocity is effectively used in this mode.

3. Third Mode

After receiving the first reference signal sent by the network device, the terminal device obtains the CSI, and the terminal device sends the second reference signal to the network device. Because a part of a downlink channel in all of the downlink channel may be strongly correlated, in this mode, the terminal device has learned of the channel status of the downlink channel, and determines that the network device can obtain a channel status of all of the downlink channel by using only the second reference signal, with no need to feed back the CSI. In this way, overheads for feeding back the CSI can be greatly reduced.

Therefore, in this embodiment of this application, the terminal device first obtains the channel status of the downlink channel based on the first reference signal sent by the network device, then determines, with reference to the channel status and the transmit ports of the terminal device, the target mode used to feed back the CSI, and notifies the network device by using the indication information. In this way, flexibility of feeding back the CSI by the terminal device can be improved.

It should be understood that the n transmit ports of the terminal device may be fixed or not fixed. This is not limited in this embodiment of this application. For example, m=4, and n=2. The terminal device has four ports (ports numbered 1 to 4), and each port is configured as a receive port. However, the terminal device has only two transmit ports. Therefore, at each moment, only two ports of the terminal device can be used as transmit ports. If the two transmit ports of the terminal device are fixed and are a port 1 and a port 2, the terminal device sends the second reference signal each time through the port 1 and the port 2. If the two transmit ports of the terminal device are not fixed, the terminal device may select two ports from the four ports as transmit ports based on the channel status of the downlink channel, that is, correlation between a downlink channel corresponding to all ports.

It should be further understood that a rank of a channel matrix or a rank of a correlation matrix is generally determined according to a decision criterion in practice. For example, an eigenvalue less than a threshold is ignored, to obtain the rank of the channel matrix or the rank of the correlation matrix. However, this is not limited in this embodiment of this application.

In one embodiment, the terminal device includes m receive ports and n transmit ports, the m receive ports include the n transmit ports, and both m and n are positive integers; and when the n transmit ports are fixed, that the terminal device determines, based on the channel status of the downlink channel, a target mode used to feed back channel state information (CSI) from a plurality of modes includes:

determining, by the terminal device, a rank of a channel matrix of the downlink channel and a rank of a correlation matrix of then transmit ports based on the channel status of the downlink channel;

comparing, by the terminal device, the rank of the correlation matrix of the n transmit ports with the rank of the channel matrix of the downlink channel; and if the rank of the correlation matrix of the n transmit ports is equal to the rank of the channel matrix of the downlink channel, determining, by the terminal device, the third mode as the target mode.

In one embodiment, the method further includes:

if the rank of the correlation matrix of the n transmit ports is less than the rank of the channel matrix of the downlink channel, determining, by the terminal device, a rank of a correlation matrix of a remaining port other than the n transmit ports in the m receive ports based on the channel status of the downlink channel;

comparing, by the terminal device, the rank of the correlation matrix of the remaining port with the rank of the channel matrix of the downlink channel; and if the rank of the correlation matrix of the remaining port is equal to the rank of the channel matrix of the downlink channel, determining, by the terminal device, the first mode as the target mode; or if the rank of the correlation matrix of the remaining port is less than the rank of the channel matrix of the downlink channel, determining, by the terminal device, the second mode as the target mode.

In one embodiment, when the n transmit ports of the terminal device are fixed, the terminal device may first determine the rank of the channel matrix of the downlink channel and the rank of the correlation matrix of the n transmit ports based on the channel status of the downlink channel, and compare the rank of the channel matrix of the downlink channel with the rank of the correlation matrix of the n transmit ports. If the rank of the correlation matrix of the n transmit ports is equal to the rank of the channel matrix of the downlink channel, it indicates that sending the second reference signal by the terminal device through the n transmit ports is sufficient to reflect the channel status of all of the downlink channel. In this case, the terminal device may select the third mode, and in one embodiment, the terminal device may send only the second reference signal to the network device.

If the rank of the correlation matrix of the n transmit ports is less than the rank of the channel matrix of the downlink channel, it indicates that sending the second reference signal by the terminal device through the n transmit ports can reflect a channel status of only the part of the downlink channel. In this case, the terminal device needs to determine a rank of a correlation matrix of remaining m-n ports other than the n transmit ports in the m receive ports based on the channel status that is of the downlink channel and that is obtained through measurement, and compare the rank of the correlation matrix of the remaining m-n ports and the rank of the channel matrix of the downlink channel. If the rank of the correlation matrix of the remaining m-n ports is equal to the rank of the channel matrix of the downlink channel, it indicates that sending the second reference signal by the terminal device through the n transmit ports does not reduce the overheads for feeding back the CSI, and the terminal device still needs to feed back the channel status of all of the downlink channel. In this case, the terminal device does not need to send the second reference signal through the n transmit ports. The first mode may be used to feed back all the information of the CSI.

If the rank of the correlation matrix of the remaining m-n ports is less than the rank of the channel matrix of the downlink channel, it indicates that the terminal device can feed back the channel status of the part of the channel by sending the second reference signal through the n transmit ports, and then feed back a channel status of another part of the channel by feeding back the part of information of the CSI, to achieve a purpose of reducing the overheads for feeding back the CSI. Therefore, in this case, the terminal device may use the second mode.

It should be understood that, in this embodiment of this application, because the channel matrix of the downlink channel reflects the channel status of all of the channel, and the correlation matrix of the n transmit ports reflects the channel status of the part of the channel, a case in which the rank of the correlation matrix of the n transmit ports is greater than the rank of the channel matrix of the downlink channel does not exist. Similarly, a case in which the rank of the correlation matrix of the remaining m-n ports is greater than the rank of the channel matrix of the downlink channel does not exist, either.

For ease of understanding, the following describes in detail how to determine the target mode in this application with reference to embodiments.

In one embodiment, m=4, and n=2. The terminal device measures a downlink channel based on a CSI-RS sent by the network device, and determines that a rank RI1 of a channel matrix of the downlink channel is 2. It is assumed that four ports are respectively referred to as ports numbered 1 to 4, and two transmit ports are respectively a port 1 and a port 2. The terminal device may determine a rank RI2 of a correlation matrix of the port 1 and the port 2 based on the foregoing measurement. There may be the following several cases based on a value of the RI2:

1. If RI2=2, that is, RI2=RI1, the terminal device may directly use the third mode.

2. If RI2<2, that is, RI2<RI1, the terminal device may determine a rank RI3 of a correlation matrix of a port 3 and a port 4 based on a result of the foregoing measurement.

(1) If RI3=2, that is, RI3=RI1, the terminal device may use the first mode.

(2) If RI3<2, that is, RI3<RI1, the terminal device may use the second mode.

In one embodiment, the terminal device includes m receive ports and n transmit ports, the m receive ports include the n transmit ports, and both m and n are positive integers; and when the n transmit ports are not fixed, that the terminal device determines, based on the channel status of the downlink channel, a target mode used to feed back channel state information (CSI) from a plurality of modes includes:

determining, by the terminal device, a rank of a channel matrix of the downlink channel based on the channel status of the downlink channel;

comparing, by the terminal device, the rank of the channel matrix of the downlink channel with the quantity n of transmit ports;

if the rank of the channel matrix of the downlink channel is less than or equal to n, determining, by the terminal device, the third mode as the target mode; and selecting, by the terminal device, n first target ports from the m receive ports as the n transmit ports, where a rank of a correlation matrix of the n first target ports is equal to the rank of the channel matrix of the downlink channel.

In one embodiment, the method further includes:

if the rank of the channel matrix of the downlink channel is greater than n, selecting, by the terminal device, n second target ports from the m receive ports as the n transmit ports based on the channel status of the downlink channel, where a rank of a correlation matrix of the n second target ports is n;

determining, by the terminal device, a rank of a correlation matrix of a remaining port other than the n second target ports in the m receive ports based on a measurement result of the downlink channel;

comparing, by the terminal device, the rank of the correlation matrix of the remaining port with the rank of the channel matrix of the downlink channel; and if the rank of the correlation matrix of the remaining port is equal to the rank of the channel matrix of the downlink channel, determining, by the terminal device, the first mode as the target mode; or if the rank of the correlation matrix of the remaining port is less than the rank of the channel matrix of the downlink channel, determining, by the terminal device, the second mode as the target mode.

In one embodiment, when then transmit ports of the terminal device are not fixed, the terminal device may select, based on an actual situation, n ports as transmit ports, to send the second reference signal. The terminal device may first determine the rank of the channel matrix of the downlink channel based on the channel status of the downlink channel, and compare the rank of the channel matrix of the downlink channel with the quantity n of transmit ports. If the rank of the channel matrix of the downlink channel is less than or equal to n, it indicates that sending the second reference signal by the terminal device through the n transmit ports can reflect the channel status of all of the downlink channel. In this case, the terminal device may use the third mode, and does not need to feed back the CSI. In this case, the terminal device needs to select the n first target ports from the m receive ports as the n transmit ports, and the rank of the correlation matrix of the selected n first target ports is equal to the rank of the channel matrix of the downlink channel.

If the rank of the channel matrix of the downlink channel is greater than n, it indicates that the terminal device cannot feed back the channel status of all of the downlink channel by sending only the second reference signal. In this case, the terminal device further needs to feed back the CSI. The terminal device may first select the n second target ports from the m receive ports as transmit ports, and the rank of the correlation matrix of the selected n second target ports is n. Then, the terminal device compares the rank of the correlation matrix of the n second target ports with the rank of the channel matrix of the downlink channel, to determine a mode used to feed back the CSI. A determining method is the same as the foregoing port determining method, and details are not described herein.

In this embodiment of this application, because the n transmit ports of the terminal device are not fixed, the terminal device may flexibly select the n transmit ports based on the channel status of the downlink channel, so that channel statuses of more parts of the channel are fed back as much as possible by sending the second reference signal through the n transmit ports. In this way, CSI fed back by the terminal device can be correspondingly reduced, thereby reducing the overheads for feeding back CSI by the terminal device.

For ease of understanding, the following describes in detail how to determine the target mode in this application with reference to embodiments.

In one embodiment, m=4, and n=2. The terminal device measures a downlink channel based on a CSI-RS sent by the network device, and determines that a rank RI1 of a channel matrix of the downlink channel is 2. It is assumed that four ports are respectively referred to as ports numbered 1 to 4, and transmit ports of the terminal device are not fixed. In this case, RI1=n, and the terminal device may directly use the third mode and select two ports that are not strongly correlated from the four ports as transmit ports, so that a rank of a correlation matrix of the two transmit ports is 2.

In one embodiment, m=4, and n=2. The terminal device measures a downlink channel based on a CSI-RS sent by the network device, and determines that a rank RI1 of a channel matrix of the downlink channel is 3. It is assumed that four ports are respectively referred to as ports numbered 1 to 4, and transmit ports of the terminal device are not fixed. In this case, RI1>n, it indicates that the network device cannot obtain a channel status of all of a downlink channel by sending an SRS through only n ports. The terminal device may select two ports from the four ports as transmit ports based on a result of the foregoing measurement, and ensure that a rank of a correlation matrix of the two ports is 2, where RI2=2, that is, RI2<RI1. It is assumed that the two ports are respectively a port 1 and a port 2. In this case, the terminal device may determine a rank RI3 of a correlation matrix of a port 3 and a port 4 based on the result of the foregoing measurement, where RI3=1 or RI3=2, that is, RI3<RI1, and the terminal device may use the second mode.

In one embodiment, the terminal device includes m receive ports and n transmit ports, the m receive ports include the n transmit ports, and both m and n are positive integers; and when the target mode is the second mode, the method further includes:

determining, by the terminal device based on the rank of the correlation matrix of the remaining port other than the n transmit ports in the m receive ports, the part of the channel that needs to be fed back;

sending, by the terminal device, the part of information to the network device, where the part of information is used to indicate a correlation matrix of the part of the channel; and sending, by the terminal device, the second reference signal to the network device through the n transmit ports.

Correspondingly, the network device receives the second reference signal and the part of information that are sent by the terminal device.

In one embodiment, if the terminal device uses the second mode to feed back the CSI, before feedback, the terminal device may determine, based on the rank of the correlation matrix of the remaining m-n channels, the part of the channel that needs to be fed back. The terminal device sends channel information of the part of the channel to the network device, and sends the second reference signal to the network device through the n transmit ports. The network device receives the second reference signal, performs channel estimation to obtain a channel status of a downlink channel corresponding to the n transmit ports, receives the part of information to obtain a channel status of a downlink channel of the remaining m-n ports, and synthesizes the channel status of the downlink channel corresponding to the n transmit ports and the channel status of the downlink channel of the remaining m-n ports, to obtain the channel status of all of the downlink channel.

For example, m=2, n=1, the first reference signal is a CSI-RS, and the second reference signal is an SRS. If the terminal device sends the SRS through two ports, all of a corresponding channel is $$H_{SRS} = \begin{bmatrix} H_1 \\ H_2 \end{bmatrix}.$$

Because a quantity of transmit ports of the terminal device is 1, the network device can obtain a channel status of only one downlink channel each time by using the SRS sent by the terminal device. It is assumed that the network device can perform channel estimation by using the SRS to obtain $H_1$. Because the network device does not obtain the channel status of all of the downlink channel, the network device may send a CSI-RS to the terminal device. The terminal device can obtain all of the downlink channel $$G_{CSI\text{-}RS} = \begin{bmatrix} G_1 \\ G_2 \end{bmatrix}$$

by using the CSI-RS. The foregoing two channel matrices $H_{SRS}$ and $G_{CSI\text{-}RS}$ include factors such as power gains of the terminal device and the network device. Therefore, the terminal device can normalize the foregoing two channel matrices to obtain the following matrices:

$$H_{SRS} = \begin{bmatrix} H_1 \\ H_2 \end{bmatrix} = h_{11} \begin{bmatrix} H_1' \\ H_2' \end{bmatrix} = h_{11} \begin{bmatrix} 1 & h_{12}' & \cdots & h_{1N}' \\ h_{21}' & h_{22}' & \cdots & h_{2N}' \end{bmatrix} = h_{11} H_{SRS}', \text{ and}$$

$$G_{CSI\text{-}RS} = \begin{bmatrix} G_1 \\ G_2 \end{bmatrix} = g_{11} \begin{bmatrix} G_1' \\ G_2' \end{bmatrix} = g_{11} \begin{bmatrix} 1 & g_{12}' & \cdots & g_{1N}' \\ g_{21}' & g_{22}' & \cdots & g_{2N}' \end{bmatrix} = g_{11} G_{CSI\text{-}RS}'$$

Based on the channel reciprocity, $[g_{21}' \ g_{22}' \ \ldots \ g_{2N}'] = [h_{21}', h_{22}' \ \ldots \ h_{2N}']$. Therefore, the network device may send the CSI-RS to the terminal device to obtain $H_2'$ by feeding back $G_2'$ by the terminal device, and receive the SRS sent by the terminal device to obtain $H_1'$ by performing channel estimation by using the SRS. Finally, the network device synthesizes $H_1'$ and $G_2'$ to obtain a correlation matrix of $$\begin{bmatrix} H_1' \\ G_2' \end{bmatrix} : [H_1'^* \ G_2'^*] * \begin{bmatrix} H_1' \\ G_2' \end{bmatrix} = H_1'^* * H_1' + G_2'^* * G_2'$$

In one embodiment, the sending, by the terminal device, the part of information to the network device includes:

sending, by the terminal device, an eigenvector and an eigenvalue of the correlation matrix of the part of the channel to the network device; and correspondingly, receiving, by the network device, the eigenvector and the eigenvalue that are of the correlation matrix of the part of the channel and that are sent by the terminal device; or sending, by the terminal device, the eigenvector, the eigenvalue, and an identifier of a normalization coefficient to the network device, where the normalization coefficient is used to normalize the correlation matrix of the part of the channel; and correspondingly, receiving, by the network device, the eigenvector, the eigenvalue, and the identifier of the normalization coefficient that are sent by the terminal device.

It should be understood that, when feeding back the part of information of the CSI, the terminal device may feed back only the eigenvector of the correlation matrix of the part of the channel to the network device, or may feed back the eigenvector and the eigenvalue of the correlation matrix of the part of the channel to the network device, or may feed back the eigenvector, the eigenvalue, and the identifier of the normalization coefficient (for example, a location of the normalization coefficient) of the correlation matrix of the part of the channel to the network device. This is not limited in this embodiment of this application. Feeding back the eigenvalue can improve accuracy of the CSI. The network device can match, based on the eigenvalue, a channel estimated by using an SRS and power of the part of the channel of CSI feedback, so that a channel synthesized by the network device is more accurate, and a channel synthesis error is reduced. However, because a range is required for quantizing an eigenvalue of a channel, a channel matrix is normalized and a normalization coefficient is reported. In this way, a fixed range of the eigenvalue can be ensured, so that the terminal device quantizes and feeds back the eigenvalue.

In one embodiment, because singular value decomposition is performed on the correlation matrix $G_2'^* G_2'$ of $G_2'$ to obtain $U^* \Lambda U$, the terminal device feeds back an eigenvector and an eigenvalue in U, and the network device can restore $G_2'^* G_2'$. Therefore, to eliminate problems such as power gains of the terminal device and the network device, after normalization is performed based on a specific element, signal power of the channel $H_1'$ obtained through estimation by using the SRS by the network device may be aligned with signal power of the channel $G_2'$ obtained through estimation by using the CSI-RS by the terminal device, to ensure accuracy of a synthesized channel. In one embodiment, only accurate feedback of $G_2'^* G_2'$ can ensure the accuracy of the synthesized channel.

As described above, in this embodiment of this application, $G_2'^* G_2'$ may be fed back in the following three manners:

1. Only an eigenvector of $G_2'^* G_2'$, is fed back.

During synthesis of $G_2'^* G_2'$, the network device may set the eigenvalue to 1 by default, and an element used to perform power alignment on $H_1'$ and $G_2'$ is an element at a preset location. In this way, a relative size of an element in $G_2'^* G_2'$ is not reflected.

2. An eigenvector and an eigenvalue of $G_2'^* G_2'$ are fed back.

During synthesis of $G_2'^* G_2'$, the network device may use the eigenvalue fed back by the terminal device, and accuracy is comparatively high. However, quantizing the eigenvalue may result in a loss because a quantization range and a quantity of quantized bits are delimited during actual quantization, and a quantization error may exist. For example, an actual eigenvalue is greater than the quantization range.

3. An eigenvector, an eigenvalue, and a label of a normalization coefficient of $G_2'^* G_2'$ are fed back.

The element used to perform power alignment on $H_1'$ and $G_2'$ is selected by the terminal device based on an element value of $G_2'$ and it is ensured as much as possible that an absolute value of each element in $G_2'$ is less than or equal to 1, so that an eigenvalue range of $G_2'^* G_2'$ is controllable, to avoid a case in which the eigenvalue range exceeds a quantization range. In addition, a quantity of quantized bits may be properly designed, to reduce a quantization error as much as possible.

It should be understood that the normalization coefficient may be the label of the normalization coefficient, or other information that may identify the normalization coefficient. This is not limited in this embodiment of this application.

In the foregoing example in which m=2 and n=1, $$G_{CSI\text{-}RS} = \begin{bmatrix} G_1 \\ G_2 \end{bmatrix}, G_{CSI\text{-}RS} = \begin{bmatrix} G_1 \\ G_2 \end{bmatrix} = g_{11} \begin{bmatrix} G_1' \\ G_2' \end{bmatrix}$$

is obtained after normalization, and an absolute value of each element in $G_2'$ is less than or equal to 1, where $$mn \geq \left[ \sum_{i=0}^{m} \sum_{j=0}^{n} |a_{ij}|^2 \right] = \sum_{r=1}^{Rank} \sigma_r^2.$$

Therefore, a quantization range of each eigenvalue is less than or equal to $\sqrt{mn}$.

It should be understood that sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the data transmission method according to an embodiment of this application with reference to FIG. 1 and FIG. 2, and the following describes in detail a data transmission apparatus according to the embodiments of this application with reference to FIG. 3 to FIG. 6.

Figure 3:
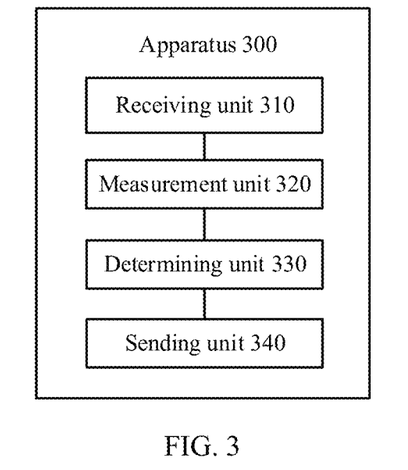
FIG. 3 is a schematic block diagram of a data transmission apparatus according to an embodiment of this application.

FIG. 3 shows a data transmission apparatus 300 according to an embodiment of this application. The apparatus 300 includes:

a receiving unit 310, configured to receive a first reference signal sent by a network device;

a measurement unit 320, configured to measure a downlink channel based on the first reference signal, to obtain a channel status of the downlink channel;

a determining unit 330, configured to determine a target mode from a plurality of modes based on the channel status of the downlink channel, where information that is used to feed back channel state information (CSI) and that is sent by the apparatus in different modes of the plurality of modes is different; and a sending unit 340, configured to send indication information to the network device, where the indication information is used to indicate the target mode.

According to the data transmission apparatus in this embodiment of this application, a terminal device first obtains the channel status of the downlink channel based on the first reference signal sent by the network device, then determines, with reference to the channel status, the target mode used to feed back the CSI, and notifies the network device by using the indication information. In this way, flexibility of feeding back the CSI by the terminal device can be improved.

In one embodiment, the plurality of modes include a first mode, a second mode, and a third mode; in the first mode, the apparatus feeds back all information of the CSI; in the second mode, the apparatus feeds back a part of information of the CSI, and sends a second reference signal; and in the third mode, the apparatus sends the second reference signal. The all information is used to indicate a channel status of all of the downlink channel, and the part of information is used to indicate a channel status of a part of the downlink channel.

In one embodiment, the apparatus includes m receive ports and n transmit ports, the m receive ports include the n transmit ports, and both m and n are positive integers; and when the n transmit ports are fixed, the determining unit 330 is configured to: determine a rank of a channel matrix of the downlink channel and a rank of a correlation matrix of the n transmit ports based on the channel status of the downlink channel; compare the rank of the correlation matrix of the n transmit ports with the rank of the channel matrix of the downlink channel; and if the rank of the correlation matrix of the n transmit ports is equal to the rank of the channel matrix of the downlink channel, determine the third mode as the target mode.

In one embodiment, the determining unit 330 is further configured to: if the rank of the correlation matrix of the n transmit ports is less than the rank of the channel matrix of the downlink channel, determine a rank of a correlation matrix of a remaining port other than the n transmit ports in the m receive ports based on the channel status of the downlink channel; compare the rank of the correlation matrix of the remaining port with the rank of the channel matrix of the downlink channel; and if the rank of the correlation matrix of the remaining port is equal to the rank of the channel matrix of the downlink channel, determine the first mode as the target mode; or if the rank of the correlation matrix of the remaining port is less than the rank of the channel matrix of the downlink channel, determine the second mode as the target mode.

In one embodiment, the terminal device includes m receive ports and n transmit ports, the m receive ports include the n transmit ports, and both m and n are positive integers; and when the n transmit ports are not fixed, the determining unit 330 is configured to: determine a rank of a channel matrix of the downlink channel based on the channel status of the downlink channel; compare the rank of the channel matrix of the downlink channel with the quantity n of transmit ports; if the rank of the channel matrix of the downlink channel is less than or equal to n, determine the third mode as the target mode; and select n first target ports from the m receive ports as the n transmit ports, where a rank of a correlation matrix of the n first target ports is equal to the rank of the channel matrix of the downlink channel.

In one embodiment, the determining unit 330 is further configured to: if the rank of the channel matrix of the downlink channel is greater than n, select n second target ports from the m receive ports as the n transmit ports based on the channel status of the downlink channel, where a rank of a correlation matrix of the n second target ports is n; determine a rank of a correlation matrix of a remaining port other than the n second target ports in the m receive ports based on a measurement result of the downlink channel; compare the rank of the correlation matrix of the remaining port with the rank of the channel matrix of the downlink channel; and if the rank of the correlation matrix of the remaining port is equal to the rank of the channel matrix of the downlink channel, determine the first mode as the target mode; or if the rank of the correlation matrix of the remaining port is less than the rank of the channel matrix of the downlink channel, determine the second mode as the target mode.

In one embodiment, the terminal device includes m receive ports and n transmit ports, the m receive ports include the n transmit ports, and both m and n are positive integers; and when the target mode is the second mode, the determining unit 330 is further configured to determine, based on the rank of the correlation matrix of the remaining port other than the n transmit ports in the m receive ports, the part of the channel that needs to be fed back. The sending unit 340 is further configured to: send the part of information to the network device, where the part of information is used to indicate a correlation matrix of the part of the channel; and send the second reference signal to the network device through the n transmit ports.

In one embodiment, the sending unit 340 is configured to: send an eigenvector and an eigenvalue of the correlation matrix of the part of the channel to the network device; or send the eigenvector, the eigenvalue, and an identifier of a normalization coefficient to the network device, where the normalization coefficient is used to normalize the correlation matrix of the part of the channel.

In one embodiment, the first reference signal is a channel state information reference signal (CSI-RS), and/or the second reference signal is a sounding reference signal (SRS).

It should be understood that the apparatus 300 herein is presented in a form of a functional unit. The term "unit" herein may be an application-specific integrated circuit (ASIC), an electronic circuit, a processor (for example, a shared processor, a special-purpose processor, or a group processor) configured to execute one or more software or firmware programs, a memory, a merge logic circuit, and/or another suitable component that supports the described function. In one embodiment, a person skilled in the art may understand that the apparatus 300 may be the terminal device in the foregoing embodiment, and the apparatus 300 may be configured to perform the procedures and/or the operations corresponding to the terminal device in the foregoing method embodiment. To avoid repetition, details are not described herein.

Figure 4:
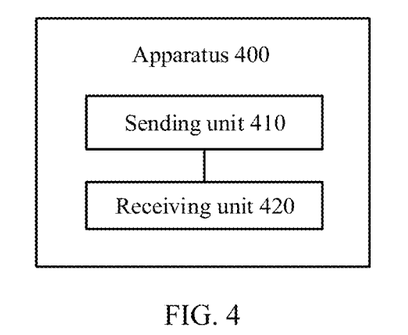
FIG. 4 is a schematic block diagram of another data transmission apparatus according to an embodiment of this application.

FIG. 4 shows another data transmission apparatus 400 according to an embodiment of this application. The apparatus 400 includes:

a sending unit 410, configured to send a first reference signal to a terminal device; and a receiving unit 420, configured to receive indication information sent by the terminal device based on the first reference signal, where the indication information is used to indicate a target mode that is used by the terminal device to feed back channel state information (CSI).

According to the data transmission apparatus in this embodiment of this application, the terminal device first obtains a channel status of a downlink channel based on the first reference signal sent by a network device, then determines, with reference to the channel status of the downlink channel, the target mode used to feed back the CSI, and notifies the network device by using the indication information. In this way, flexibility of feeding back the CSI by the terminal device can be improved.

In one embodiment, the target mode is a first mode, a second mode, or a third mode; in the first mode, the terminal device feeds back all information of the CSI; in the second mode, the terminal device feeds back a part of information of the CSI, and sends a second reference signal; and in the third mode, the terminal device sends the second reference signal. The all information is used to indicate a channel status of all of the downlink channel, and the part of information is used to indicate a channel status of a part of the downlink channel.

In one embodiment, the target mode is the second mode, and the receiving unit 420 is further configured to: after receiving the indication information sent by the terminal device based on the first reference signal, receive the second reference signal sent by the terminal device; and receive the part of information sent by the terminal device based on the first reference signal.

In one embodiment, the receiving unit 420 is configured to: receive an eigenvector and an eigenvalue that are of a correlation matrix of the part of the channel and that are sent by the terminal device; or receive the eigenvector, the eigenvalue, and an identifier of a normalization coefficient that are sent by the terminal device, where the normalization coefficient is used to normalize the correlation matrix of the part of the channel.

In one embodiment, the apparatus further includes a processing unit, configured to: perform channel estimation based on the second reference signal, to obtain a correlation matrix of an uplink channel; synthesize the correlation matrix of the part of the channel based on the eigenvector and the eigenvalue; superpose the correlation matrix of the uplink channel and the correlation matrix of the part of the channel, to obtain a correlation matrix of all of the downlink channel; and obtain a downlink precoding matrix based on the correlation matrix of the all of the channel.

In one embodiment, the first reference signal is a channel state information reference signal (CSI-RS), and/or the second reference signal is a sounding reference signal (SRS).

It should be understood that the apparatus 400 herein is presented in a form of a functional unit. The term "unit" herein may be an application-specific integrated circuit (ASIC), an electronic circuit, a processor (for example, a shared processor, a special-purpose processor, or a group processor) configured to execute one or more software or firmware programs, a memory, a merge logic circuit, and/or another suitable component that supports the described function. In one embodiment, a person skilled in the art may understand that the apparatus 400 may be the network device in the foregoing embodiment, and the apparatus 400 may be configured to perform the procedures and/or the operations corresponding to the network device in the foregoing method embodiment. To avoid repetition, details are not described herein.

Figure 5:
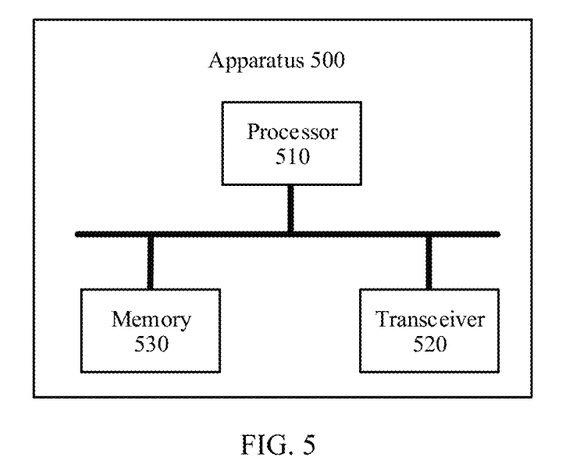
FIG. 5 is a schematic block diagram of still another data transmission apparatus according to an embodiment of this application.

FIG. 5 shows still another data transmission apparatus 500 according to an embodiment of this application. The apparatus 500 includes a processor 510, a transceiver 520, and a memory 530. The processor 510, the transceiver 520, and the memory 530 communicate with each other through an internal connection path. The memory 530 is configured to store an instruction, and the processor 510 is configured to execute the instruction stored in the memory 530, to control the transceiver 520 to send a signal and/or receive a signal.

The transceiver 520 is configured to receive a first reference signal sent by a network device. The processor 510 is configured to: measure a downlink channel based on the first reference signal, to obtain a channel status of the downlink channel; and determine a target mode from a plurality of modes based on the channel status of the downlink channel, where information that is used to feed back channel state information (CSI) and that is sent by the apparatus in different modes of the plurality of modes is different. The transceiver 520 is further configured to send indication information to the network device, where the indication information is used to indicate the target mode.

It should be understood that the apparatus 500 may be specifically the terminal device in the foregoing embodiment, and may be configured to perform the operations and/or the procedures corresponding to the terminal device in the foregoing method embodiment. In one embodiment, the memory 530 may include a read-only memory and a random access memory, and provide an instruction and data to the processor. A part of the memory may further include a non-volatile random access memory. For example, the memory may further store information about a device type. The processor 510 may be configured to execute the instruction stored in the memory. In addition, when the processor 510 executes the instruction stored in the memory, the processor 510 is configured to perform the operations and/or the procedures corresponding to the terminal device in the foregoing method embodiment.

Figure 6:
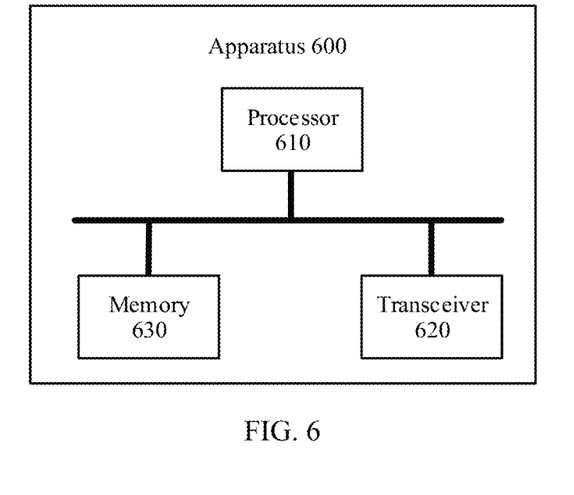
FIG. 6 is a schematic block diagram of yet another data transmission apparatus according to an embodiment of this application.

FIG. 6 shows yet another data transmission apparatus 600 according to an embodiment of this application. The apparatus 600 includes a processor 610, a transceiver 620, and a memory 630. The processor 610, the transceiver 620, and the memory 630 communicate with each other through an internal connection path. The memory 630 is configured to store an instruction, and the processor 610 is configured to execute the instruction stored in the memory 630, to control the transceiver 620 to send a signal and/or receive a signal.

The transceiver 620 is configured to: send a first reference signal to a terminal device; and receive indication information sent by the terminal device based on the first reference signal, where the indication information is used to indicate a target mode that is used by the terminal device to feed back channel state information (CSI).

It should be understood that the apparatus 600 may be the network device in the foregoing embodiment, and may be configured to perform the operations and/or the procedures corresponding to the network device in the foregoing method embodiment. In one embodiment, the memory 630 may include a read-only memory and a random access memory, and provide an instruction and data to the processor. A part of the memory may further include a non-volatile random access memory. For example, the memory may further store information about a device type. The processor 610 may be configured to execute the instruction stored in the memory. In addition, when the processor 610 executes the instruction stored in the memory, the processor 610 is configured to perform the operations and/or the procedures corresponding to the network device in the foregoing method embodiment.

It should be understood that, in this embodiment of this application, the processor of the foregoing apparatus may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, the operations in the foregoing methods can be implemented by using a hardware integrated logical circuit in the processor, or by using instructions in a form of software. The operations of the method disclosed with reference to the embodiments of this application may be directly performed by a hardware processor, or may be performed by using a combination of hardware in the processor and a software unit. The software unit may be located in a mature storage medium in the art, for example, a random access memory, a flash memory, a read-only memory, a programmable read-only memory, an electrically erasable programmable memory, or a register. The storage medium is located in the memory, and the processor executes an instruction in the memory and completes the operations in the foregoing methods in combination with hardware of the processor. To avoid repetition, details are not described herein.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that method operations and units described in the embodiments disclosed in this specification may be implemented by electronic hardware, computer software, or a combination thereof. To clearly describe interchangeability between the hardware and the software, the foregoing has generally described operations and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A data transmission apparatus comprising:
a processor;
a memory configured to store at least one computer instruction which when executed by the processor, causes the processor to:
receive a first reference signal sent by a network device;
measure a downlink channel based on the first reference signal to obtain a channel status of the downlink channel;
determine a target mode from a plurality of modes based on the channel status of the downlink channel, wherein information used to feed back channel state information (CSI) and sent in different modes of the plurality of modes is different, wherein the plurality of modes comprise a first mode, a second mode, and a third mode; in the first mode, the apparatus feeds back all information of the CSI; in the second mode, the apparatus feeds back a part of information of the CSI, and sends a second reference signal; and in the third mode, the apparatus sends the second reference signal; and
send indication information to the network device, wherein the indication information is used to indicate the target mode.

2. The apparatus according to claim 1, wherein the feedback of all information of the CSI is used to indicate a channel status of all of the downlink channel, and the feedback of the part of information of the CSI is used to indicate a channel status of a part of the downlink channel.

3. The apparatus according to claim 2, wherein the apparatus comprises m receive ports and n transmit ports, the m receive ports comprise the n transmit ports, and both m and n are positive integers; and when the n transmit ports are fixed, the processor is configured to:
determine a rank of a channel matrix of the downlink channel and a rank of a correlation matrix of the n transmit ports based on the channel status of all of the downlink channel;
compare the rank of the correlation matrix of the n transmit ports with the rank of the channel matrix of the downlink channel; and
if the rank of the correlation matrix of the n transmit ports is equal to the rank of the channel matrix of the downlink channel, determine the third mode as the target mode.

4. The apparatus according to claim 3, wherein the processor is further configured to:
if the rank of the correlation matrix of the n transmit ports is less than the rank of the channel matrix of the downlink channel, determine a rank of a correlation matrix of a remaining port other than the n transmit ports in the m receive ports based on the channel status of the downlink channel;
compare the rank of the correlation matrix of the remaining port with the rank of the channel matrix of the downlink channel; and
if the rank of the correlation matrix of the remaining port is equal to the rank of the channel matrix of the downlink channel, determine the first mode as the target mode; or if the rank of the correlation matrix of the remaining port is less than the rank of the channel matrix of the downlink channel, determine the second mode as the target mode.

5. The apparatus according to claim 2, wherein the apparatus comprises m receive ports and n transmit ports, the m receive ports comprise the n transmit ports, and both m and n are positive integers; and when the n transmit ports are not fixed, the processor is configured to:
determine a rank of a channel matrix of the downlink channel based on the channel status of the downlink channel;
compare the rank of the channel matrix of the downlink channel with the quantity n of transmit ports;
if the rank of the channel matrix of the downlink channel is less than or equal to n, determine the third mode as the target mode; and
select n first target ports from the m receive ports as the n transmit ports, wherein a rank of a correlation matrix of the n first target ports is equal to the rank of the channel matrix of the downlink channel.

6. The apparatus according to claim 5, wherein the processor is further configured to:
if the rank of the channel matrix of the downlink channel is greater than n, select n second target ports from the m receive ports as the n transmit ports based on the channel status of the downlink channel, wherein a rank of a correlation matrix of the n second target ports is n;
determine a rank of a correlation matrix of a remaining port other than the n second target ports in the m receive ports based on a measurement result of the downlink channel;
compare the rank of the correlation matrix of the remaining port with the rank of the channel matrix of the downlink channel; and
if the rank of the correlation matrix of the remaining port is equal to the rank of the channel matrix of the downlink channel, determine the first mode as the target mode; or if the rank of the correlation matrix of the remaining port is less than the rank of the channel matrix of the downlink channel, determine the second mode as the target mode.

7. The apparatus according to claim 2, wherein the apparatus comprises m receive ports and n transmit ports, the m receive ports comprise the n transmit ports, and both m and n are positive integers; and when the target mode is the second mode, the processor is further configured to:
determine, based on a rank of the correlation matrix of a remaining port other than the n transmit ports in the m receive ports, the part of the downlink channel that needs to be fed back; and
a sending unit is configured to:
send the part of information to the network device, wherein the part of information is used to indicate a correlation matrix of the part of the channel; and
send the second reference signal to the network device through the n transmit ports.

8. The apparatus according to claim 7, wherein the processor is configured to:
send an eigenvector and an eigenvalue of the correlation matrix of the part of the downlink channel to the network device; or
send the eigenvector, the eigenvalue, and an identifier of a normalization coefficient to the network device, wherein the normalization coefficient is used to normalize the correlation matrix of the part of the downlink channel.

9. The apparatus according to claim 1, wherein the first reference signal is a channel state information reference signal (CSI-RS); and/or
the second reference signal is a sounding reference signal (SRS).

10. A data transmission apparatus comprising:
a processor;
a memory configured to store at least one computer instruction which when executed by the processor causes the processor to:
send a first reference signal to a terminal device; and
receive indication information sent by the terminal device based on the first reference signal, wherein the indication information is used to indicate a target mode that is used by the terminal device to feed back channel state information (CSI), wherein the target mode is a first mode, a second mode, or a third mode; in the first mode, the terminal device feeds back all information of the CSI; in the second mode, the terminal device feeds back a part of information of the CSI, and sends a second reference signal; and in the third mode, the terminal device sends the second reference signal.

11. The apparatus according to claim 10, wherein the feedback of all information of the CSI is used to indicate a channel status of all of the downlink channel, and the feedback of the part of information of the CSI is used to indicate a channel status of a part of the downlink channel.

12. The apparatus according to claim 11, wherein the target mode is the second mode, and the processor is further configured to:
after receiving the indication information sent by the terminal device based on the first reference signal, receive the second reference signal sent by the terminal device; and
receive the part of information sent by the terminal device based on the first reference signal.

13. The apparatus according to claim 12, wherein the processor is configured to:
receive an eigenvector and an eigenvalue that are of a correlation matrix of the part of the downlink channel and that are sent by the terminal device; or
receive the eigenvector, the eigenvalue, and an identifier of a normalization coefficient that are sent by the terminal device, wherein the normalization coefficient is used to normalize the correlation matrix of the part of the downlink channel.

14. The apparatus according to claim 13, wherein the processor is further configured to:
perform channel estimation based on the second reference signal, to obtain a correlation matrix of an uplink channel;
synthesize the correlation matrix of the part of the downlink channel based on the eigenvector and the eigenvalue;
superpose the correlation matrix of the uplink channel and the correlation matrix of the part of the downlink channel, to obtain a correlation matrix of all of the downlink channel; and
obtain a downlink precoding matrix based on the correlation matrix of the all of the downlink channel.

15. The apparatus according to claim 10, wherein the first reference signal is a channel state information reference signal (CSI-RS); and/or
the second reference signal is a sounding reference signal (SRS).

16. A non-transitory computer readable medium, configured to store a computer program, wherein the computer program comprises an instruction which when executed by a processor, causes the processor to perform a method comprising:
receiving a first reference signal sent by a network device;
measuring a downlink channel based on the first reference signal to obtain a channel status of the downlink channel;
determining a target mode from a plurality of modes based on the channel status of the downlink channel, wherein information used to feed back channel state information (CSI) and sent in different modes of the plurality of modes is different, wherein the plurality of modes comprise a first mode, a second mode, and a third mode; in the first mode, the processor feeds back all information of the CSI; in the second mode, the processor feeds back a part of information of the CSI, and sends a second reference signal; and in the third mode, the processor sends the second reference signal; and
sending indication information to the network device, wherein the indication information is used to indicate the target mode.

17. The non-transitory computer readable medium according to claim 16, wherein the feedback of all information of the CSI is used to indicate a channel status of all of the downlink channel, and the feedback of the part of information of the CSI is used to indicate a channel status of a part of the downlink channel.

18. The non-transitory computer readable medium according to claim 17, wherein the first reference signal is a channel state information reference signal (CSI-RS); and/or
the second reference signal is a sounding reference signal (SRS).

* * * * *